Feb. 26, 1935.  E. W. STACEY  1,992,250

CUTTING DIE

Filed July 22, 1932

INVENTOR—
Ernest W. Stacey
By his attorney
Victor Cobb

Patented Feb. 26, 1935

1,992,250

UNITED STATES PATENT OFFICE 1,992,250

CUTTING DIE

Ernest W. Stacey, Beverly, Mass., assignor to United Shoe Machinery Corporation, Paterson, N. J., a corporation of New Jersey Application July 22, 1932, Serial No. 624,079

1 Claim. (Cl. 219—29)

This invention relates to dies and is herein illustrated as embodied in a cutting die adapted for operation in cutting blanks from sheet rubber stock.

In factories engaged in the making of shoes from rubber, such as overshoes, it has heretofore been customary to form parts of uppers of such shoes by a hand operation in which are employed steel dies which are struck by a hammer to force the dies through sheet rubber in forming the upper blanks. One difficulty which has been experienced in cutting blanks in the manner referred to has been that the material from which the blanks are cut sticks to the edges of the dies in such a way as to take additional time on the part of the operator to separate the blanks after they are cut and, furthermore, the dies used must be very heavy to withstand the blows to which they are subjected, making it difficult for the operator to manipulate such dies. In another method of forming such blanks it has heretofore been common practice to make use of a pattern and a knife which the operator moves around the pattern to form the blank. One difficulty experienced in cutting blanks by this method is that the material will accumulate on the knife requiring frequent cleaning thereof and, further, frequent sharpening of the knife is necessitated.

In view of the foregoing it is an object of the invention to provide a cutting device which, without sacrificing any of the characteristic advantages of devices heretofore used for the purpose, will be better adapted to perform cutting operations upon sheet rubber stock. With this end in view, and as illustrated, the invention consists in the provision of a cutting die comprising a metallic cutting member arranged to be included in an electric circuit whereby the cutting member may be heated.

Dies constructed in the manner referred to have been found to be advantageous in the cutting of blanks from sheet rubber in that the heated cutting blade acts upon the material in such a manner as to render it more readily separated. It has also been found that such a die need not be of heavy construction and can therefore be readily handled. Furthermore, in its operation only a slight pressure of the die upon the material is required to produce a blank, thus reducing the amount of effort exerted by the operator.

Other objects and features of the invention will be apparent from the following detailed description when taken in connection with the accompanying drawing and will be pointed out in the claim.

Figure 1:
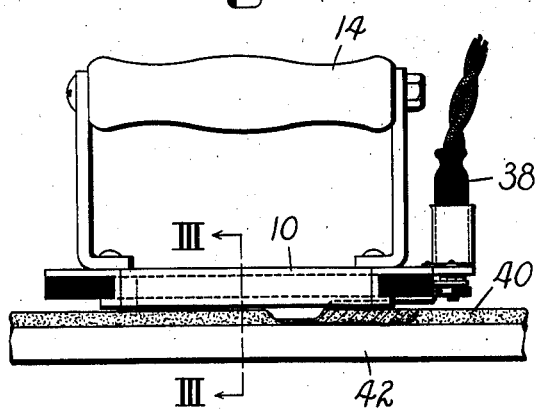
Fig. 1 is a side view of a cutting die illustrating one embodiment of the invention, the die being shown in operative relation to work to be operated upon.
Figure 2:
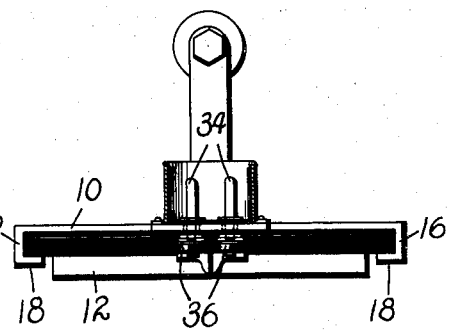
Fig. 2 is an end view partly in section of the die.
Figure 4:
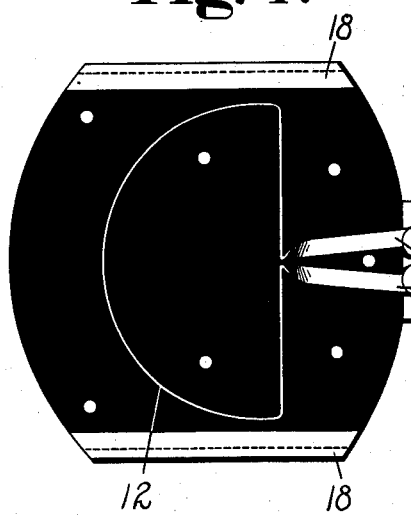
Fig. 4 is a bottom view of the die.
Figure 3:
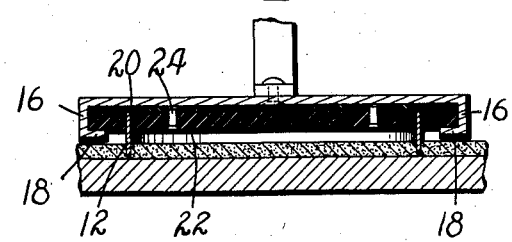
Fig. 3 illustrates a cross section of the die taken along line III—III of Fig. 1.
Figure 5:
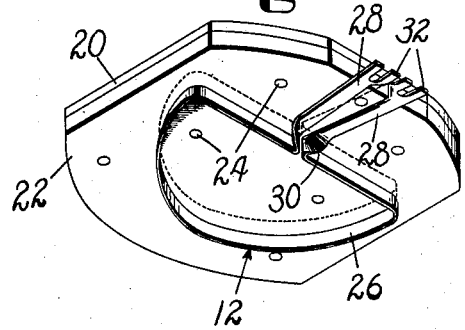
Fig. 5 is a perspective view illustrating the arrangement of cutting blade and insulating material.

As shown in Figs. 1 and 2 of the drawing the die comprises a die base 10 which carries a cutting blade 17 and is provided with a handle 14 for the convenient manipulation of the die. The base 10 comprises a metallic plate having at opposite sides flanges 16 which are bent downwardly and inwardly to form ears 18 for retaining in position in engagement with the plate layers 20 and 22 of insulating material which are slid into position longitudinally of the die. The cutting blade 12 is positioned against the layer 20 of the material and then additional insulation 22 is molded around and within the die and secured in position by rivets 24 which pass through the layers 20 and 22.

The cutting blade 12 is formed of a ribbon of steel bent into a loop 26 corresponding to the periphery of the blank to be cut and having leads 28 extending from the ends of the loop. These leads are bent downwardly adjacent to the loop as indicated by reference character 30 so that the leads will not engage the material to be cut. The ends of the leads 28 have forked ends 32 which are held in position in engagement with terminals 34 (Fig. 2) by means of binding posts 36 secured to the base 10. Current is supplied to the terminals 34 in the usual manner by means of an electrical connection 38.

In the operation of the device current supplied to the terminals 34 will be conducted by the leads 28 through the cutting blade 26 which acts as a resistance in the electrical circuit with the result that the temperature of the blade is raised to approximately 300°. In the cutting operation the operator merely presses the die, by means of the handle 14, downwardly against the upper surface of material such as sheet rubber 40 positioned upon a support 42. The heat supplied by the cutting blade so conditions the material that the exertion of a comparatively light pressure upon the die will result in the forcing of the blade through the material to form a blank. The die is then picked up and moved into another position upon the material and the cycle is repeated.

It is to be noted that the construction of the handle and die base is such that the cutting blade and the insulating material associated therewith can be readily removed and a separate unit substituted. It is to be further noted that the ends of the loop forming the cutting blade are positioned close together at the points from which the leads 28 project from the blade. Consequently the cutting action of the blade will result in the severance of a complete blank from the material except for a slight fin which can be readily severed upon removal of the blank.

Having thus described my invention, what I claim as new and desire to secure by Letters Patent of the United States is:

A cutting die comprising a plate of insulated material, a thin strip of metal extending normal to the plate and having upstanding edge portions in the form of a loop corresponding in shape to the outline of a blank to be produced, and leads extending from the ends of the loop for conducting an electric current to the loop.

ERNEST W. STACEY.